United States Patent [19]

Muenger et al.

[11] Patent Number: 4,801,307
[45] Date of Patent: Jan. 31, 1989

[54] QUENCH RING AND DIP-TUBE ASSEMBLY

[75] Inventors: James R. Muenger, Beacon, N.Y.; Americo R. Catena, Rancho Palos Verdes, Calif.; John S. Stevenson, Gardena, Calif.; Anthony E. Bergin, Garden Grove, Calif.; John M. Veillon, West Covina, Calif.; Michael W. Becker, Long Beach, Calif.

[73] Assignee: Texaco Inc., White Plains, N.Y.

[21] Appl. No.: 775,206

[22] Filed: Sep. 12, 1985

Related U.S. Application Data

[63] Continuation-in-part of Ser. No. 604,767, Apr. 27, 1984, abandoned.

[51] Int. Cl.$^4$ .................................................. C10J 3/72
[52] U.S. Cl. ..................................... 48/69; 261/112.1; 422/207
[58] Field of Search ...................... 48/69, 62 R, 76, 77; 422/194, 207; 261/112, DIG. 54; 55/238, 242, 255, 256; 110/171, 215, 216

[56] References Cited

U.S. PATENT DOCUMENTS 2,896,927  7/1959  Nagle et al. .................. 261/112
3,593,968  7/1971  Geddes ......................... 261/112
4,218,423  8/1980  Robin et al. .................. 422/207

Primary Examiner—Kenneth M. Schor
Assistant Examiner—Joye L. Woodard
Attorney, Agent, or Firm—Robert A. Kulason; James J. O'Loughlin; Albert Brent

[57] ABSTRACT

An assembly of a quench liquid distribution ring and dip-tube with or without a draft tube for use in a hot effluent gas quench cooling zone containing a pool of quench liquid in the bottom in combination with a vertical cylindrical free-flow refractory lined reaction zone of a partial oxidation gas generator. The hot effluent gas from the reaction zone passes through a bottom central discharge outlet and passage and then through a coaxial vertical dip-tube that extends down into a pool of quench liquid. A quench liquid distribution ring that includes an annular rectangular shaped bottom feed quench liquid distribution channel, surrounds the outside diameter of the dip-tube at its upstream end. A quench ring face and cover is provided that comprises a vertical cylindrical shaped leg portion and a top horizontal flat ring plate portion that extends perpendicularly outward from the upstream end of the leg portion. The cylindrical shaped leg portion extends downward and overlaps the inside surface of the inner wall of said annular rectangular shaped quench liquid distribution channel thereby providing an annular shaped gap therebetween. The top horizontal flat ring plate portion provides a gas and liquid tight cover with the annular quench liquid distribution channel when the two parts are bolted to a floor flange connected to the support floor for the refractory that lines the reaction zone of the gas generator. A plurality of slot orifices pass through the inner wall of said annular distribution channel to provide free passage for the quench liquid between the distribution channel and the annular gap. The annular gap may be kept full of quench liquid and free from gas and vapor pockets, thereby avoiding poor heat transfer. A spiralling layer of quench liquid may be supplied to and distributed over the inside surfaces of the inner wall of the quench liquid distribution channel and the cylindrically shaped dip-tube.

4 Claims, 2 Drawing Sheets

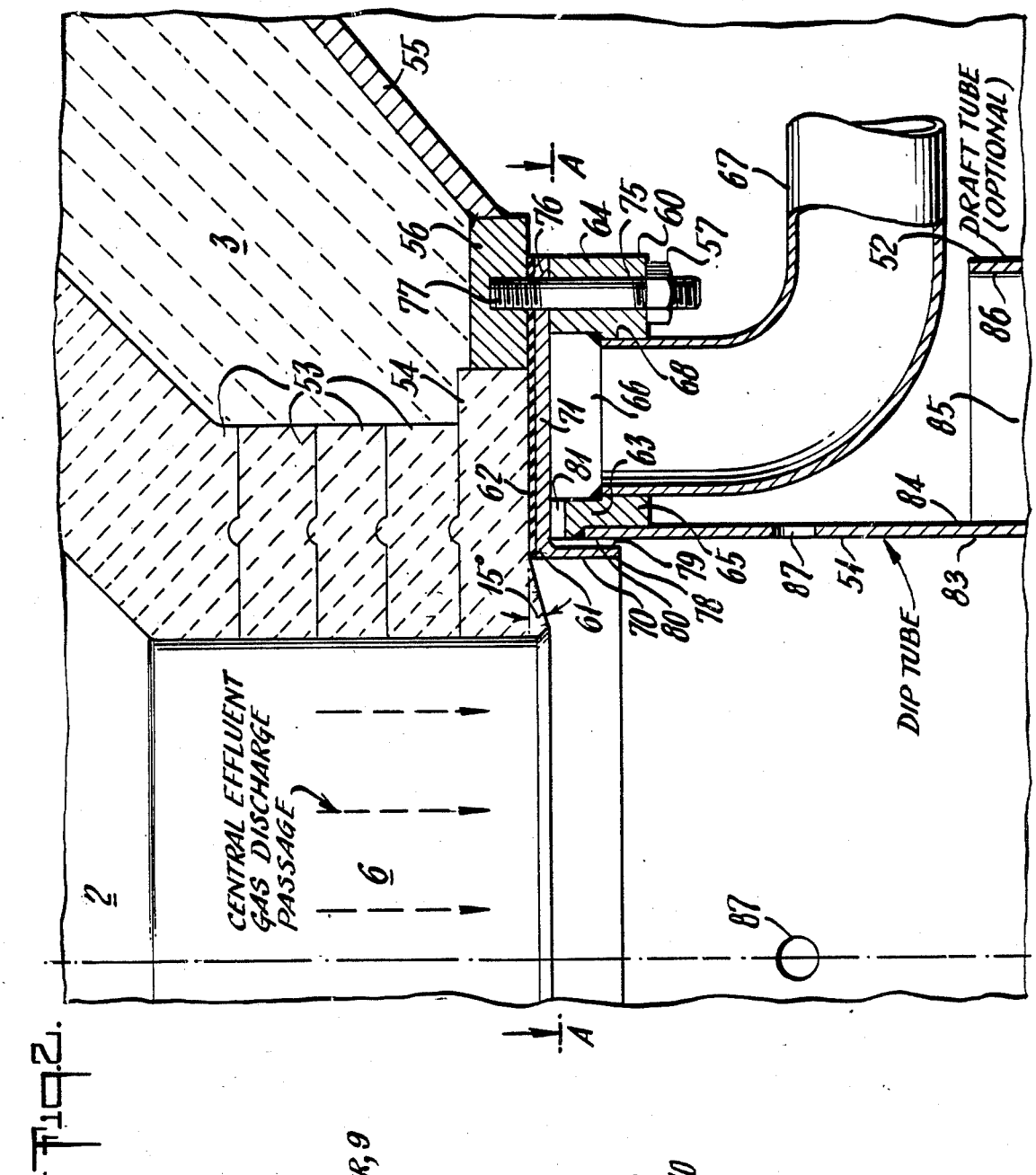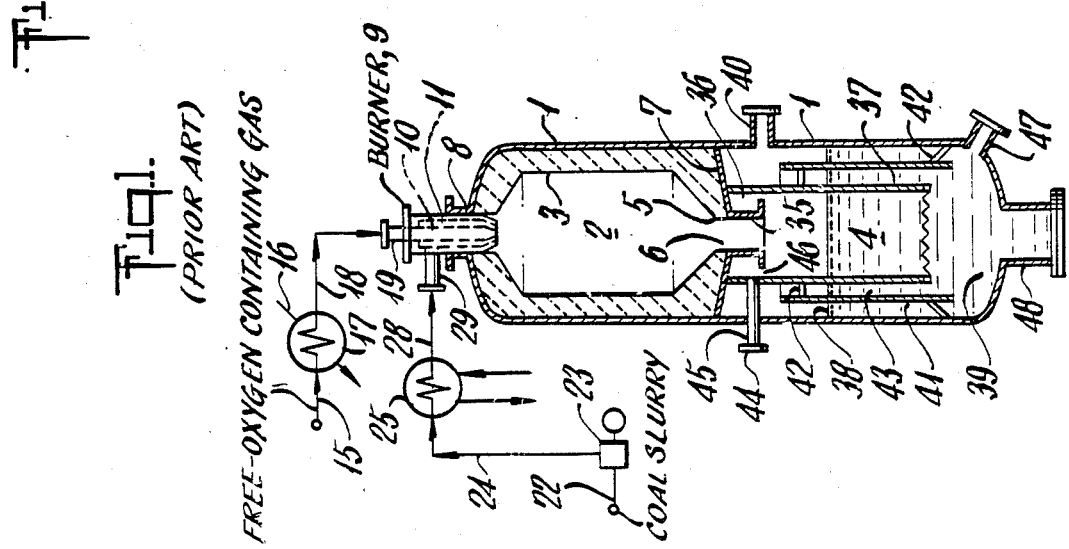

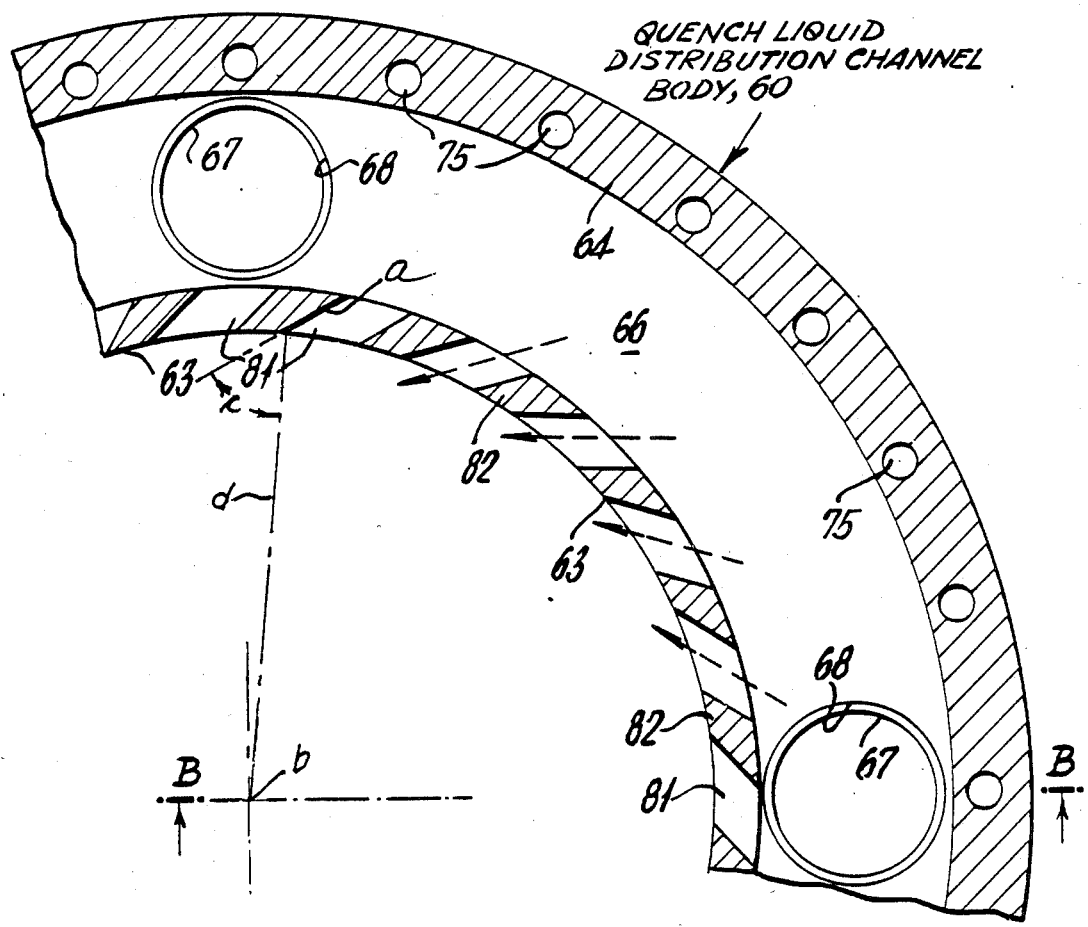
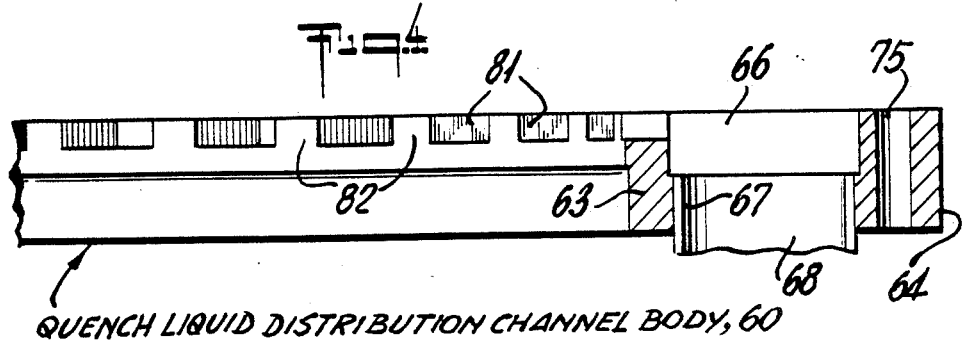

QUENCH RING AND DIP-TUBE ASSEMBLY

This is a continuation-in-part of application Ser. No. 604,767, filed in the U.S. Patent Office on Apr. 27, 1984, now abandoned.

BACKGROUND OF THE INVENTION

This invention relates to an improved quench ring and dip tube assembly for use in combination with a quench tank and gasifier for the production of quench cooled and scrubbed synthesis gas, reducing gas or fuel gas. More specifically, the quench ring and dip-tube assembly is used in the hot effluent gas quench section which is located within a pressure vessel that also contains the gasification section for the partial oxidation of hydrocarbonaceous fuels or slurries of solid carbonaceous fuels.

The Texaco partial oxidation process is a well known process for producing synthesis gas, reducing gas, or fuel gas. In this process, gaseous or liquid hydrocarbonaceous, or solid carbonaceous fuels may be reacted with a free-oxygen containing gas in a refractory lined reaction zone to produce a hot effluent gas stream comprising $H_2$, $CO$, $CO_2$ and at least one material from the group comprising $H_2O$, $CH_4$, $N_2$, $H_2S$, and $COS$. Depending on the feedstock and operating conditions particulate matter may be entrained in the hot effluent gas stream.

All of the hot raw effluent gas stream may be cooled by direct quenching in water contained in a quench vessel located under the reaction zone such as shown and described in coassigned U.S. Pat. Nos. 2,818,326; 2,871,114 and 2,896,927. Alternatively, all of the hot effluent gas stream may be cooled by indirect heat exchange with a coolant such as shown and described in coassigned U.S. Pat. No. 4,251,228. In another gas cooling procedure, the hot effluent gas stream is split into two separate gas streams. One split gas stream is then cooled by direct quenching in water in a quench tank, and the other split gas stream is cooled in a gas cooler, such as shown and described in coassigned U.S. Pat. No. 3,998,609.

The stream of hot effluent gas which is produced in the upper free-flow refractory lined reaction zone is discharged downward through a bottom outlet in the reaction zone. The central longitudinal axis of the bottom outlet is coaxial with that of the gas generator. The refractory lining at the bottom of the reaction zone is supported by a floor. At least a portion of the effluent gas stream may be then cooled and scrubbed with water by discharging said effluent gas stream down through a connecting passage and then through a coaxial down flowing connecting dip-tube that terminates under a pool of water contained in a quench tank below. In order to prevent the thin-walled dip-tube from warping or being otherwise damaged, water is used to control the metal temperature. Thus, a quench water distribution ring, located at the top of the dip-tube provides a film of water over the inside surface of the dip-tube along its length. Optionally, a coaxial draft tube may surround the dip-tube and provide an annular passage through which the quenched gas may rise. A dip-tube and draft tube in a separate quench tank, that is for example in a steel pressure vessel located downstream from the reaction zone is shown in coassigned U.S. Pat. No. 2,818,326. The use of a dip leg in a quench chamber located in the bottom of a steel pressure vessel that also provides a gas cooler for cooling another split stream of gas is shown in coassigned U.S. Pat. No. 3,998,609. Mounting the quench water distribution ring against the floor of the reactor vessel for cooling same, and directing cooling water against the inside of the dip tube is shown in coassigned U.S. Pat. No. 4,218,423.

With increasingly severe service requirements, including high pressure and the use of feedstocks of high sulfur and high metals content, it has become necessary to improve the design of the quench water distribution ring in order to assure adequate water supply. Analysis of metal samples from failed quench rings indicates sulfur attack upon the quench ring faces. This, in turn, is indicative of high metal temperature, i.e., possibly 1300° F. or higher at the faces exposed to the high temperature synthesis gas. Poor welds are particularly subject to failure. All of the aforesaid coassigned U.S. Patents are incorporated herein by reference.

SUMMARY

This invention pertains to an improved quench liquid distribution ring and dip-tube assembly for use in a hot effluent gas quench chamber zone, such as a quench tank containing a pool of quench liquid in the bottom. This assembly is used in the combination with the bottom section of a vertical cylindrical free-flow partial oxidation gas generator having at least one refractory lined reaction chamber with a bottom central effluent gas discharge passage. The central longitudinal axis of the gas discharge passage is coaxial with the reaction zone of the gas generator and the quench liquid distribution ring and dip tube assembly.

The hot effluent gas stream from the central discharge passage passes through the coaxial dip tube and then into the pool of quench liquid where it is quench cooled and scrubbed. Optionally, a coaxial draft tube may surround the dip tube to provide an annular passage through which the quenched gas stream rises in contact with dispersed quench liquid. The reaction zone of the gas generator and the central discharge passage are lined with refractory. A supporting floor with an attached floor flange retains the refractory lining. The distribution ring assembly includes an annular shaped quench liquid distribution channel of rectangular cross-section having a vertical central axis which is coaxial with that of said central effluent gas discharge passage and having inner and outer vertical cylindrical shaped walls and a flat ring shaped closed bottom that extends between said walls. The quench liquid distribution chamber surrounds the top of the dip tube, on the outside. The downstream end of the dip tube is submerged in the pool of quench liquid, and the upstream end is in communication with the central gas discharge passage. A quench ring face and cover covers the quench liquid distribution channel and has a vertical central axis which is coaxial with that of the distribution channel. The quench ring face and cover comprises a vertical cylindrical shaped leg portion which is joined at the top by a horizontal flat ring plate portion that extends outwardly and perpendicularly. The cylindrical shaped leg portion extends downward and has inside and outside faces. Further, it overlaps the inner cylindrical shaped wall of the quench liquid distribution channel on the outside to provide an annular shaped gap of uniform width from top to bottom. The inside diameter of the cylindrical shaped leg portion of said ring flange is greater than that of said central effluent gas discharge passage, so that the outside face of the leg portion is not blasted by the hot effluent gas stream being discharged from the central discharge passage. With nuts or bolts or by other fastening devices, the top of the quench liquid distribution channel is secured to the underside of the horizontal ring plate portion of the quench ring face and cover. The upper surface of the horizontal ring plate portion is fastened to the underside of the refractory support floor flange. A portion of the horizontal ring plate supports the underside of the refractory lining at the downstream end of the central discharge passage. Gasketing provides water and gas-tight seals between the support floor flange, refractory, and the mating surface of the quench ring face and cover.

A plurality of slot orifices of uniform cross-section pass through the top of the annular shaped inner wall of the distribution channel and provide passages between the distribution channel and the coaxial annular shaped gap for the flow of the quench liquid. A plurality of streams of quench liquid are thereby simultaneously and horizontally discharged through the orifices. The separate streams merge into a single swirling body of water. While rectangular slot orifices are preferred, in one embodiment the orifices are round. The annular shaped gap is kept filled with quench liquid. Further, a spiralling layer of quench liquid having a thickness in the range of about 0.5 to 1.2 times the width of the annular shaped gap is thereby supplied to and uniformly distributed over the entire inside surface of the coaxial vertical cylindrical shaped dip-tube which extends downward from the inner vertical wall of the distribution channel to below the level of the quench liquid. The slot orifices are uniformaly oriented so that a horizontal plane through the slot orifice in the quench liquid distribution channel and cutting the vertical central longitudinal axis provides an outside angle in the range of about 0° to 90°, and preferably about 90°, between a line representing the straight extension of that wall of the slot orifice which is furthest from the vertical central axis of the quench liquid distribution channel body and a radial running in said horizontal plane between a point representing the intersection of said horizontal plane and the vertical central axis of the quench liquid distribution channel body and the point in said horizontal plane representing the intersection between said furthest wall of said slot orifice and the inside surface of the inner wall of the quench liquid distribution channel body. Preferably, the slot orifices are oriented so that the quench liquid is discharged from said slot orifices horizontally and tangentially to the inside surface of the inner wall of said quench liquid distribution channel. In such case, the tangential velocity is in the range of about 10 to 60 feet per second. Further in such case, this tangential velocity is preferably about 10 to 30 times the vertically downward velocity of the quench liquid in the annular gap. At least one inlet hole is provided to retain at least one feed pipe for introducing quench liquid into the bottom of the distribution channel. The subject improved quench liquid distribution ring assures that the annular gap may be kept full of quench liquid and free from gas and vapor pockets. It also ensures uniform vigorous flow on the interior surface of the vertical face of the assembly that is exposed to the hot gas. Poor heat transfer is thereby avoided and the life of the quench ring and dip-tube assembly is extended.

BRIEF DESCRIPTION OF THE DRAWING

This invention will be further understood by reference to the accompanying drawings.

FIG. 1 is a schematic vertical cross section illustrating a quench ring dip-tube assembly according to the prior art;

FIG. 2 is an enlarged partial detailed vertical cross section of an improved quench liquid distribution ring and dip tube assembly according to the invention. This partial view is taken to the right of the center line passing through the symmetrical region including central passage 6.

FIG. 3 is a plan view of a quarter section of the quench liquid distribution channel taken through section A—A of FIG. 2.

FIG. 4 is a vertical view taken through section B—B of that portion of the quench liquid distribution channel shown in FIG. 3.

DESCRIPTION OF THE INVENTION

A more complete understanding of the invention may be had by reference to the accompanying drawing which illustrates in FIG. 1 a quench ring and dip-tube assembly in combination with a quench tank and gasifier as provided in the prior art. In comparison, the present invention is illustrated in FIGS. 2, 3, and 4.

In FIG. 1, closed cylindrical vertical steel pressure vessel 1 comprises two main sections: reaction zone 2 lined with refractory 3 located in the upper section of vessel 1, and quench zone 4 located in the lower section of vessel 1. In another embodiment, quench zone 4 may be contained in a separate cylindrical vertical steel pressure vessel which is connected below the separate cylindrical reaction zone vessel, such as provided in coassigned U.S. Pat. No. 2,818,326. Preferably, the central vertical longitudinal axis of reaction zone 2 and quench zone 4 are coaxial. Bottom central coaxial outlet 5 and bottom connecting coaxial central vertical cylindrical shaped effluent gas discharge passage 6 places the bottom portion of reaction zone 2 in direct communication with the upper portion of quench zone 4. Thermal refractory 3 is supported at the bottom by a metal shelf, such as frusto-conical shaped refractory support floor 7.

Upper coaxial central inlet 8 of vessel 1 is provided with a burner 9 for introducing the reactant feedstreams into reaction zone 2. Any suitable burner may be used, for example, the annular type burner described in coassigned U.S. Pat. No. 2,928,460. Burner 9 includes central passage 10 through which a feedstream of free-oxygen containing gas is passed and annular passage 11 through which a fuel feedstream is passed. Thus, a stream of free-oxygen containing gas in line 15 may be heated by heat exchange with steam from line 16 in heat exchanger 17 and passed through line 18, inlet 19 and central conduit 10. A liquid hydrocarbonaceous or a pumpable slurry of solid carbonaceous fuel in line 22 is pumped by means of pump 23 through line 24, optionally preheated in heat exchanger 25 and/or atomized by a vapor or gas moderator stream (not shown), line 28, and inlet 29 into annular passage 11.

The partial oxidation reaction takes place in free-flow reaction zone 2 at a temperature in the range of about 1800° to 3000° F., such as about 2000° to 2800° F., and a pressure in the range of about 10 to 190 atmospheres, such as about 30 to 100 atmospheres. A hot raw effluent gas stream principally comprising $H_2$, CO, $CO_2$, $H_2O$ (vapor), and containing entrained particulate matter from the group particulate carbon, soot, ash, slag, unburned solid fuel and mixtures thereof is produced in reaction zone 2. The hot raw effluent gas stream passes down through bottom central outlet 5, connecting coaxial central passage 6, the inside diametric surface 35 of quench liquid distribution ring 36, dip tube 37, and is discharged below liquid level 38 of the pool of quench liquid 39 contained in the bottom of quench zone 4. Substantially any pumpable liquid coolant may be used as the quench liquid. Suitable quench liquids include water, liquid hydrocarbonaceous fluids, semi-organic fluids, and a dispersion of one of said fluids and particulate solids from the group particulate carbon, soot, ash, and mixtures thereof.

The quench cooled and scrubbed gas stream leaves quench zone 4 by way of outlet 40 in the side wall of shell 1. Optionally, a coaxial cylindrical sleeve or draft tube 41 surrounds dip 37 and is radially spaced therefrom by spacers or supports 42 to provide annular gas passage 43 through which the gas stream rises in intimate contact with the quench liquid. Liquid coolant is supplied to quench ring 36 through inlet 44 and line 45. Quench ring 36 is annular shaped and is provided with opening 46 in the bottom from which flows the water introduced through inlet 44 and line 45. A dispersion of quench liquid and the particulate solids that were removed from the hot effluent gas stream during quenching is removed from the bottom of quench tank 4 by way of side outlet 47 and sent to a conventional quench liquid recovery zone (not shown). A portion of the recovered quench liquid may be recycled to quench ring 36 by way of inlet 44 and line 45. Periodically, accumulations of solid matter may be removed for disposal through bottom outlet 48.

With the prior art quench ring design shown in FIG. 1, it may become difficult to keep quench ring 36 filled with quench liquid. If vapor and gas pockets form in the upper portion of quench ring 36, the flow of quench water becomes nonuniform. Accordingly, refractory support floor 7 and diametric surface 35 of quench liquid distribution ring 36 and dip-tube 37 may increase in temperature to a point where the metal fails or is attacked by the $H_2S$ and COS in the hot effluent gas stream. Further, when exposed to such severe service conditions poor welds are more readily subject to failure. These difficulties have been eliminated by the improved invention shown in FIGS. 2–4.

FIG. 2 is an enlarged detailed vertical cross-section showing a portion of the area surrounding the right half of central bottom outlet 5 and coaxial central effluent gas discharge passage 6. The relationship of this region with respect to the partial oxidation reaction zone and to the quench zone is similar to that shown in FIG. 1. However, the prior art quench ring 36 of FIG. 1 has been replaced by the subject invention which includes an improved quench liquid distribution ring and dip-tube assembly. The area surrounding the central discharge passage 6 to the left of the center line (not shown) is substantially symmetrical with the area to the right of the center line that is shown in FIG. 2. At the bottom of reaction chamber 2, thermal refractory lining 3 includes a plurality of refractory face bricks 53 and 54 that line the central effluent gas discharge passage 6. Frusto-conical refractory support floor 55 is attached, for example by welding, at the upper end to the inside wall of the steel pressure vessel (not shown). At the lower end, floor 55 is attached to a flat ring shaped floor flange 56. Quench liquid distribution ring and dip tube assembly is attached to the underside of floor flange 56 by conventional attachment means, such as bolting 57, or other fastening devices.

The quench liquid distribution ring and dip-tube assembly comprises distribution channel body 60, quench ring face and cover 61, dip-tube 51, and gasketing 62. A top portion of draft tube 52 is shown and may be optionally included with said assembly. Quench liquid distribution channel body 60 is coaxial with the central longitudinal axis of central effluent gas discharge passage 6. It is annular shaped and has inner 63 and outer 64 vertical cylindrical shaped walls and a flat ring shaped closed bottom 65 extending between said walls. When unassembled, the upper rectangular-shaped channel portion 66 of quench liquid distribution channel body 60 is open. When assembled, channel body 60 is covered with the upper flat ring portion 71 of the quench ring face and cover 61. Optionally, conventional gasketing may be inserted between channel body 60 and quench ring face and cover 61 to provide a gas and liquid tight seal. Fresh quench liquid is introduced into channel portion 66 by way of a plurality of feed pipes 67. Improved mechanical connections may be obtained by drilling inlet holes 68 in channel body 60 every 90°. The holes pass from the underside into channel portion 66 to provide pipe entrances. The end of each pipe is inserted into a hole 68 and welded in place. The inside diameter of inner wall 63 may be increased along a portion its length starting from the bottom to accomodate the wall thickness of dip tube 51. By this means distribution channel body 60 may be slid down over the external diameter of dip tube 51 near its upper end, thereby avoiding a stepped wall. These two parts are then secured in place, for example by welding. The weld seams are ground smooth. Unlike the welds in prior art construction, any welded joints in channel body 60 can be fully inspected. Preferably, channel body 60 is made from one piece of metal. For example, channel body 60 may be machined from a solid billet of stainless steel. This will provide a very rigid clamp for quench ring face and cover 61 and good support for supply pipes 67 and the dip-tube 51.

Quench ring face and cover 61 for quench liquid distribution channel 60 has a vertical central axis which is coaxial with that of distribution channel 60 and that of gas discharge passage 6. Quench ring face and cover 61 comprises a vertical cylindrical shaped leg portion 70 that extends downward and overlaps the inner vertical wall 63 of distribution body 60, and a horizontal flat ring plate portion 71 that extends perpendicularly and outwardly from the top of said leg portion. As previously mentioned, flat ring plate portion 71 covers channel portion 66 upon installation. For example, by aligning bolt holes 75 and 76 in channel body 60 and flat ring plate 71, respectively, said parts may be bolted to the undersides of floor flange 56 and refractory 54 by screwing nut and bolt 57 into threaded hole 77 in floor flange 56. Cylindrical shaped leg portion 70 has inside and outside faces 78 and 79, respectfully. Outside face 79 is radially spaced from the inside diameter of inner wall 63 to provide annular gap 80 of uniform width from top to bottom. Further, leg portion 70 may overlap on the outside the welds joining dip-tube 51 to the inner vertical cylindrical shaped wall 63 of distribution channel body 60 thereby protecting the welded area with a layer of water.

In order to limit the direct contact of inside face 78 to the stream of hot effluent gas being discharged from the downstream end of central passage 6, the inside diameter of the vertical cylindrical shaped leg portion of the quench ring face and cover 61 is increased radially beyond the diameter of passage 6. The front portion of the flat underside of refractory lining 54 at the downstream end of central passage 6 overhangs the vertical leg portion 70 of quench ring face and cover 61. The rear portion of the refractory surrounding gas discharge passage 6 is supported on the bottom by the front portion of flat ring plate 71. The front portion of the refractory surrounding the gas discharge passage 6 is thereby cantilevered. Preferably, to confine gasket 62 and to provide the inside face of leg portion 70 with some shielding from the hot gas stream, the flat bottom front portion of refractory 54 that extends beyond inside face 78 may slope downward at an angle of about 10-30°, such as about 15°, Optionally, a refractory protective ring (not shown) may be fixed to the front of inside face 78.

The narrow annular gap 80 that extends with a uniform width from the top of distribution channel body 60 to the bottom of cylindrical shaped leg portion 70 is maintained between the external peripheral surfaces of inner wall 63 with dip tube 51 attached thereto and outside face 79 of cylindrical shaped leg portion 70. The height of annular gap 80 is about 1 to 6 times, such as 1.5 to 3 times the height of orifice 81. A plurality of slot orifices 81 of uniform cross-section are located in the top of inner wall 63 and provide a plurality of communicating passages for the free-flow of fresh quench liquid flowing from the channel portion 66 of distribution body 60 to annular gap 80. While rectangular orifices are preferred, in one embodiment, orifices 81 may be round.

A portion of the outside surface 84 of dip-tube 51 located above the level of the coolant contained in the bottom of the quench tank (not shown) is cooled by an upflowing mixture of quenched gas and water spray. For example, the quenched gas may pass up through annular passage 85 located between outside surface 84 of dip-tube 51 and inside surface 86 of draft tube 52. Typically, the diameter of dip tube 51 is in the range of about 12 to 48 inches, such as about 18 to 36 inches.

A ring of several small diameter weep holes 87 are located near the upper end of dip-tube 51 and above the level of the quench liquid contained in the quench tank. By this means, the pressure on both sides of dip-tube 51 may be equalized, and quench fluid is thereby prevented from being forced out of the quench tank up the dip-tube to the hot refractory should downstream pressure ever exceed generator pressure through some mal operation.

FIG. 3 is a plan view of a quarter section of the quench liquid distribution channel body 60 taken through section A—A of FIG. 2. FIG. 4 is a vertical view taken through section B—B of that portion of the quench liquid distribution channel body 60 shown in FIG. 3. The layout of the plurality of bolt holes 75 in outer vertical cylindrical shaped wall 64 in the quarter section is clearly shown. The annular shaped quench liquid distribution channel 66 and connecting slot orifices 81 are also shown along with entrance holes 68 and the ends of quench liquid feed pipes 67.

A plurality of rectangular slot orifices 81 for providing passage of the quench liquid from distribution channel 66 to annular gap 80 (not shown) are located around inner wall 63 of distribution channel 60. The direction of flow is shown by the dotted arrows. The slot orifices are separated from each other by uncut portions 82 of inner wall 63 in the amount of about 3/16-2 inches such as about ¼-1 inch. For example, the center to center distance between adjacent orifices may be about 2 inches to 4 inches, or less. The slots are uniformly offset from a radial about 0° to 90°, such as about 45° to 90°, and preferably about 90° to facilitate distribution of the quench liquid in annular gap 80, and to avoid stagnation points which could lead to high temperature areas. As shown in FIG. 3, a horizontal plane through slot orifices 81 cuts the vertical central axis of quench liquid distribution channel body 60 at point "b" and provides wall "a" of rectangular orifice 81 which is furthest from central axis "b". A straight extension of wall "a" e.g., 180° in said horizontal plane makes an outside angle "c" in the range of about 0° to 90°, with a radial between point "b" and a point in the horizontal plane where line "a" intersects the inside surface of inner wall 63 of quench liquid distribution channel body 60. Preferably, orifices 81 are oriented so that quench liquid is discharged substantially horizontally and tangentially to the inside surface of inner wall 63 of distribution channel 60.

Slot orifices 81 leading from distribution channel 66 to annular gap 80 are sized to give a velocity to the quench liquid passing through the slot orifice which is approximately ¾ to 30, such as about 1 to 10 times the vertically downward velocity of the quench liquid in gap 80. For example, the quench liquid velocity through orifices 81 may be in the range of about 3 to 60 feet per second, such as about 10 to 30 feet per second to insure good scrubbing of the inside surface 79 of leg portion 70 of FIG. 2. In the embodiment where angle "c" is about 90°, all of the slot orifices 81 are oriented so that the quench liquid is discharged horizontally and tangentially to the inside surface of inner wall 63. In such case, the tangential velocity through each of the plurality of orifices 81 is in the range of about 10 to 60 feet per second, such as about 20 to 40 feet per second, and preferably about 30 to 60 feet per second. The tangential velocity in this embodiment is preferably about 10 to 30 times the vertically downward velocity of the quench liquid in annular gap 80. The pressure drop assures equal flow through all orifices. Slot orifices 81 are so located that the quench liquid enters at the top of annular gap 80. All of the vapor and gas in gap 80 is thereby purged; and gas and vapor pockets which would otherwise give poor heat transfer are eliminated.

Annular gap 80 is operated full of quench liquid, and a uniform flow of water passes down through gap opening 80. Further a layer of quench liquid is thereby provided to the inside surface 83 of dip-tube 51, as shown in FIG. 2. The thickness of this layer of quench liquid may be in the range of about 0.5 to 1.2 times the width of the annular shaped gap 80. Dip-tube 51 is thereby protected from thermal damage, and sticking of particles of soot, slag, or ash is prevented.

In one embodiment, the minimum vertically downward velocity of quench liquid in annular gap 80 that will ensure that annular gap 80 is full of quench liquid may be expressed by the following Equation I:

$$V = \sqrt{2g\,H/c} \qquad \text{I}$$

wherein:
V=minimum vertically downward velocity of quench liquid through the annular gap that will ensure that annular gap 80 is full of quench liquid (ft/sec)
   g=gravitational constant (32.2 ft/sec$^2$)
   H=interior height of annular gap (feet)

c = empirical constant approximately equal to 1.25

In suitable design, H may vary in the range of about ¼ inch to 6 inches, such as about ¾ inch to 3 inches. The width of annular gap 80 may vary in the range of about ⅛ inch to 1 inch such as about 3/16 inch to ¾ inch. In a preferred embodiment where the orifices are offset from radial "d" about 90°, the interior height of annular gap 80 and the width of annular gap 80 may be equal to about 1.5 times the height of orifice 81. Also, in this specific embodiment, the ratio in inches of the interior height of the annular gap 80 to the width of annular gap 80 may be in the range of about ⅔ to 1.5, such as about 1.0. Further, a spiralling layer of quench liquid may be supplied to and distributed over the entire surfaces of the inner wall of the quench liquid distribution channel and the cylindrically shaped dip-tube, and preferably over all of said inside surfaces.

Other modifications and variations of the invention as hereinbefore set forth may be made without departing from the spirit and scope thereof, and therefore only such limitations should be imposed on the invention as are indicated in the appended claims.

I claim:

1. In a quench water distribution ring and dip-tube assembly in combination with a refractory lined reaction chamber which are located in the same vertical cylindrical free-flow gasifier, said quench liquid distribution ring and dip-tube assemble being for use in a hot effluent gas quench cooling zone partially filled with quench water which is located in the bottom section of said vertical cylindrical free-flow gasifier for the partial oxidation of a sulfur and metals-containing liquid hydrocarbonaceous fuel or a pumpable slurry of solid carbonaceous fuel at a temperature in the range of about 1800° to 3000° F. to produce a stream of a raw synthesis gas, reducing gas or fuel gas, comprising $H_2$, CO, $CO_2$, $H_2O$, and containing entrained particulate matter from the group consisting of particulate carbon, soot, ash, slag, unburned solid fuel, and mixtures thereof, wherein said refractory lined reaction chamber has a refractory lined bottom central effluent gas discharge passage whose central longitudinal axis is coaxial with that of the gasifier, and said reaction chamber is in the upper section of said gasifier and has a supporting floor with a floor flange for said refractory lining, the improvement comprising: an annular shaped quench water distribution channel having a vertical central axis which is coaxial with that of said central effluent gas discharge passage and having inner and outer vertical cylindrical shaped walls and a flat ring shaped closed bottom that extends between said walls; a quench ring face and cover for said quench water distribution channel having a vertical central axis which is coaxial with that of said distribution channel and comprising a vertical cylindrical shaped leg portion that extends downward and which has inside and outside faces, and a horizontal flat ring plate portion that extends perpendicularly and outwardly from the top of said leg portion, wherein the downstream outlet of said refractory lined central effluent gas discharge passage terminates near the top of said quench ring face and cover, and wherein the inside surface of said inner cylindrical wall of said distribution channel is radially and uniformly spaced from the outside surface of the vertical cylindrical shaped leg portion of said quench ring face and cover to provide an annular shaped gap of uniform width from top to bottom; wherein the ratio in inches of the interior height of said annular shaped gap to the width of said annular shaped gap is in the range of about ⅔ to 1.5, wherein the inside diameter of the vertical cylindrical shaped leg portion of said quench ring face and cover is increased radially beyond the diameter of the central effluent gas discharge passage, and a rear portion of the flat underside of the refractory lining at the downstream end of said central passage is supported by said quench ring cover while a front portion overhangs the vertical leg portion of the quench ring face and cover and slopes downward at an angle in the range of about 10° to 30°; means for securing the top of said quench water distribution channel to the underside of the horizontal ring plate portion of said quench ring face and cover, and for securing the upper surface of said horizontal ring plate portion to said refractory support floor flange; gasketing means between at least one surface of said horizontal ring plate portion of the quench ring face and cover and at least one mating surface; a plurality of slot orifices of uniform cross-section passing through the top of said inner wall of said distribution channel and providing a plurality of passages between said distribution channel and said annular shaped gap, wherein said slot orifices are rectangular shaped or round and wherein a straight extension of the furthest side of each slot orifice from the central longitudinal axis makes an outside angle of about 90° with a radial in a horizontal plane that intersects the central longitudinal axis of said quench water distribution channel and said slot orifice, wherein a plurality of streams of quench water emerge simultaneously and horizontally from the plurality of slot orifices and tangentially to the inside surface of the inner wall of said quench water distribution channel body and with a tangential velocity in the range of about 10 to 60 feet per second and said tangential velocity being about 10 to 30 times the vertically downward velocity of the quench water in said annular gap, and wherein the separate streams of quench water merge into a single swirling body of quench water; a coaxial vertical cylindrical shaped dip-tube extending downward from the inner vertical wall of said distribution channel to below the level of said quench water; wherein the upstream end of said dip tube is welded to the inner vertical wall of the distribution channel and said welds are overlapped by the vertical cylindrical shaped leg portion of said quench ring face and cover thereby protecting the welded area with a layer of water; and wherein said dip tube is provided with a ring of weep holes located in the wall of said dip tube near its upstream end; and at least one inlet means provided in the bottom of said distribution channel for introducing quench water; whereby said annular shaped gap is operated full of said quench water and free from gas and vapor pockets, and a spiralling layer of quench water is supplied to and distributed over the entire inside surfaces of the inner wall of said quench water distribution channel and the cylindrically shaped dip-tube, and wherein the spiralling layer of quench water on the interior surface of said dip-tube has a thickness in the range of about 0.5 to 1.2 times the width of the annular shaped gap.

2. The apparatus of claim 1 provided with a thermal refractory protective lining on the inner face of the vertical cylindrical shaped leg portion of said quench ring face cover.

3. The apparatus of claim 1 wherein the interior height of said annular shaped gap is about 1.5 times the height of said slot orifices.

4. The apparatus of claim 1 provided with a coaxial vertical cylindrical shaped draft tube that surrounds said dip-tube along its length.

* * * * *